(12) United States Patent
Lee et al.

(10) Patent No.: US 8,318,129 B2
(45) Date of Patent: Nov. 27, 2012

(54) HYDROTALCITE IMPARTING IMPROVED THERMORESISTANCE TO RESINS AND PREPARATION METHOD THEREOF

(75) Inventors: Sung Wook Lee, Yuseong-gu (KR); DongHo Hyun, Cheongju-si (KR)

(73) Assignees: DOOBON Inc. (KR); Sung Wook Lee (KR); DongHo Hyun (KR)

( * ) Notice: Subject to any disclaimer, the term of this patent is extended or adjusted under 35 U.S.C. 154(b) by 0 days.

(21) Appl. No.: 12/918,506

(22) PCT Filed: Feb. 12, 2009

(86) PCT No.: PCT/KR2009/000665
§ 371 (c)(1),
(2), (4) Date: Aug. 20, 2010

(87) PCT Pub. No.: WO2009/104877
PCT Pub. Date: Aug. 27, 2009

(65) Prior Publication Data
US 2010/0331470 A1    Dec. 30, 2010

(30) Foreign Application Priority Data

Feb. 20, 2008    (KR) .................. 10-2008-0015247

(51) Int. Cl.
*C01F 7/00* (2006.01)
*C08K 3/22* (2006.01)

(52) U.S. Cl. ........................ 423/600; 524/436
(58) Field of Classification Search ............... 524/436; 423/600
See application file for complete search history.

(56) References Cited

U.S. PATENT DOCUMENTS 5,106,898 A * 4/1992 Nosu et al. .............. 524/313

FOREIGN PATENT DOCUMENTS

| EP | 0 989 095 A1 | 3/2000 |
|---|---|---|
| EP | 1 052 223 A1 | 11/2000 |
| JP | 59 152941 | 8/1984 |
| JP | 59152941 A * | 8/1984 |

OTHER PUBLICATIONS

Full English language translation of JP 59-152941 A, Aug. 31, 1984.*

* cited by examiner

*Primary Examiner* — Vickey Nerangis
(74) *Attorney, Agent, or Firm* — Don D. Cha; Hamilton DeSanctis & Cha, LLP

(57) ABSTRACT

This invention relates to a partially dehydrated hydrotalcite obtained by heat-treating a hydrotalcite under a specific condition so that its weight is reduced by 1.5 to 5%, which is capable of imparting improved thermoresistance to a synthetic resin.

2 Claims, 5 Drawing Sheets

FIG. 3C

| Time (min) Sample | 0 | 10 | 20 | 30 | 40 | 50 | 60 | 70 | 80 |
|---|---|---|---|---|---|---|---|---|---|
| HT(X) | | | | | | | | | |
| 240 (°C) | | | | | | | | | |
| 190 (°C) | | | | | | | | | |
| 120 (°C) | | | | | | | | | |

HYDROTALCITE IMPARTING IMPROVED THERMORESISTANCE TO RESINS AND PREPARATION METHOD THEREOF

FIELD OF THE INVENTION

The present invention relates to a hydrotalcite which is capable of imparting improved thermoresistance to a synthetic resin, and a preparation method thereof.

BACKGROUND OF THE INVENTION

A hydrotalcite is generally represented by the chemical formula of $M^{II}_{1-x}M^{III}_x(OH)_2(A^{n-})_{x/n} \cdot (1-3x/2)H_2O$, wherein $M^{II}$ is a divalent metal cation, $M^{III}$ is a trivalent metal cation, $A^{n-}$ is an n-valent anion and x is in the range of 0.20 to 0.33 (see *J. Mater. Chem.*, 12: 3191-3198, 2002; and *J. Therm. Anal. Cal.*, 84: 473-478, 2006).

A hydrotalcite is generally used as an additive to improve chlorine-resistance and thermoresistance of various synthetic resin products such as polyvinyl chloride (PVC) and polyurethane, and various preparation methods of preparing thereof which use a metal salt, a metal oxide, a metal hydroxide, a urea, etc. have been disclosed (see U.S. Pat. No. 4,351,814 in the name of Kyowa Chemical Industry Co. issued on 1982 Sep. 28; U.S. Pat. No. 4,904,457 in the name of Aluminum Company of America issued on 1990 Feb. 27; U.S. Pat. No. 5,250,279 in the name of J. M. Huber Corporation issued on 1993 Oct. 5; and Korean Patent No. 454273 in the name of Doobon Co., Ltd. issued on 2004 Oct. 14). However, the hydrotalcites prepared by these methods tend to undergo undesirable physical property changes when introduced in a synthetic resin due to the presence of water molecules on the surface and between the layers. Such $H_2O$ molecules can be removed by high temperature treatment but structural deformation may also occur due to dehydroxylation (see *J. Therm. Anal. Cal.*, 84: 473-478, 2006).

The present inventors have found that crystal water molecules of a hydrotalcite additive lowers the thermoresistance of a synthetic resin and found that a structurally stable hydrotalcite having a minimal amount of crystal water can be prepared.

SUMMARY OF THE INVENTION

Accordingly, it is an object of the present invention to provide a structurally stable hydrotalcite having a minimal amount of crystal water.

It is another object of the present invention to provide a preparation method of the hydrotalcite of the present invention.

In accordance with one aspect of the present invention, there is provided a hydrotalcite of formula (I):

$$Mg_{1-x}Al_x(OH)_2(A^{n-})_{x/n} \cdot \{(1-a)(1-3x/2)-a \cdot z/18\}H_2O \quad (I)$$

(wherein, $A^{n-}$ is an anion selected from the group consisting of $CO_3^{2-}$, $NO^{3-}$, $SO_4^{2-}$, $OH^-$, $F^-$, $Cl^-$, $Br^-$ and an oxoanion comprising Si, P or B; z is a formula weight of $Mg_{1-x}Al_x(OH)_2(A^{n-})_{x/n}$; x is in the range of $0.20<x \leq 0.33$; a is in the range of $0.015 \leq a \leq 0.05$).

In accordance with another aspect of the present invention, there is provided a method for preparing the hydrotalcite of the present invention, comprising treating the hydrotalcite of formula (II) at a temperature of 160 to 220° C. to reduce the weight of the hydrotalcite of formula (II) by 1.5 to 5%:

$$Mg_{1-x}Al_x(OH)_2(A^{n-})_{x/n} \cdot (1-3x/2)H_2O \quad (II)$$

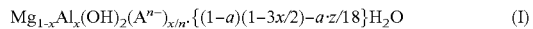

(wherein, $A^{n-}$ and x are the same as defined in formula (I)).

The present invention also provides a synthetic resin composition comprising the hydrotalcite of the present invention and a product produced with the synthetic resin composition of the present invention.

The hydrotalcite of formula (I) according to the present invention can improve the thermoresistance of a synthetic resin by adding thereto.

BRIEF DESCRIPTION OF THE DRAWINGS

The above and other objects and features of the present invention will become apparent from the following description of the invention, when taken in conjunction with the accompanying drawings, which respectively show:

FIGS. 3A to 3C: color changes of PVC samples comprising the heat-treated hydrotalcites obtained in Example 2.

DETAILED DESCRIPTION OF THE INVENTION

Figure 1:
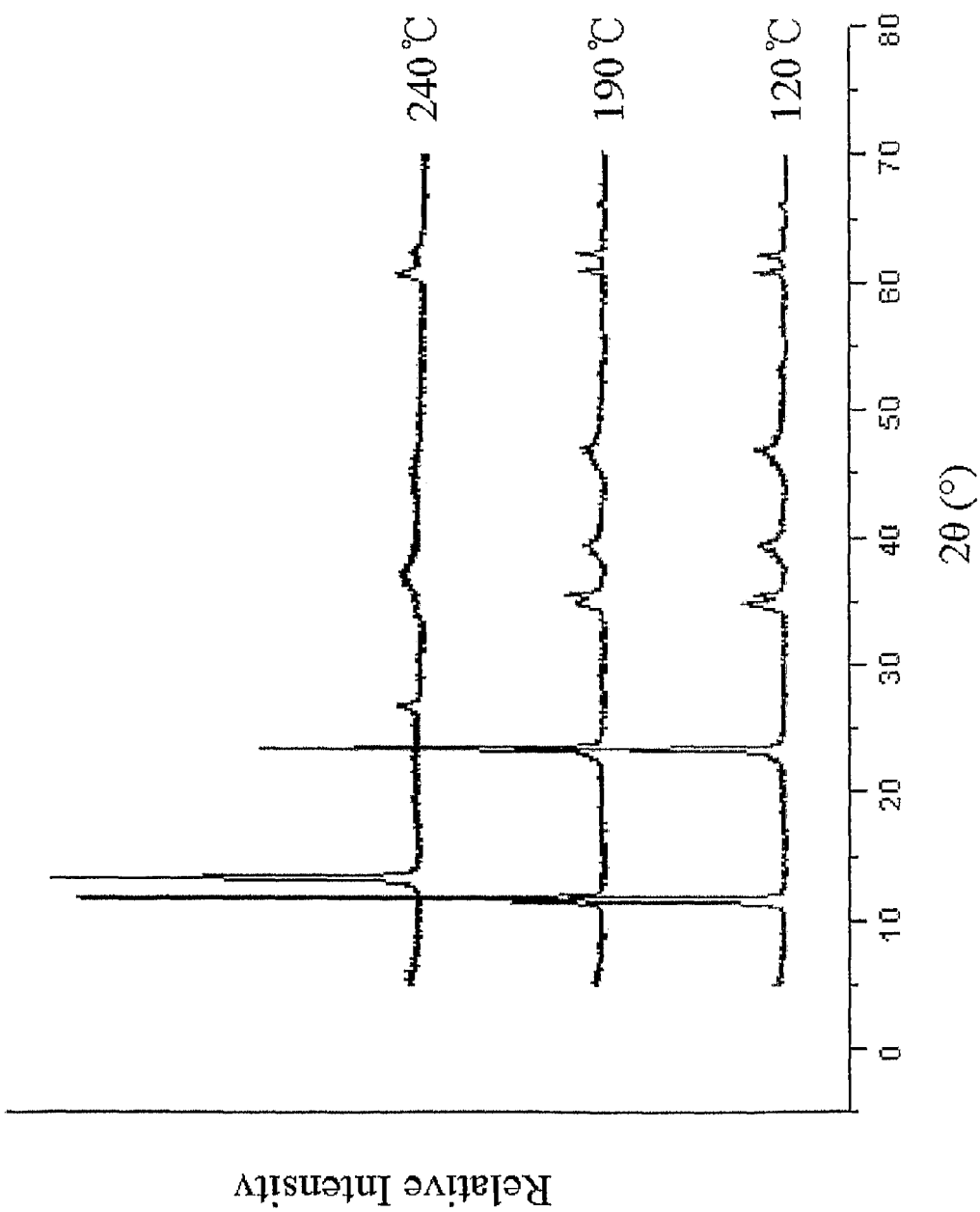
FIG. 1: X-ray diffraction (XRD) patterns of the hydrotalcites heat-treated at 120, 190 and 240° C., respectively, obtained in Example 1.

The hydrotalcite of formula (I) according to the present invention is characterized by that a portion of the crystal water molecules corresponding to an amount of about 1.5 to 5% of the weight of a hydrotalcite is removed by a specific heat-treatment procedure.

An example of the hydrotalcite of the present invention whose crystal water is removed by an amount of 2% of the weight of a hydrotalcite can be represented by formula (Ia):

$$Mg_{1-x}Al_x(OH)_2(A^{n-})_{x/n} \cdot \{0.98(1-3x/2)-0.02 \cdot z/18\}H_2O \quad (Ia)$$

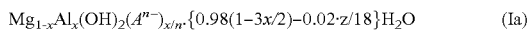

(wherein, $A^{n-}$, x and z are the same as defined in formula (I)).

Another example of the hydrotalcite of the present invention whose crystal water is removed by an amount of 4% of the weight of a hydrotalcite can be represented by formula (Ib):

$$Mg_{1-x}Al_x(OH)_2(A^{n-})_{x/n} \cdot \{0.96(1-3x/2)-0.04 \cdot z/18\}H_2O \quad (Ib)$$

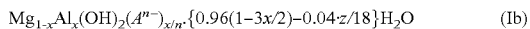

(wherein, $A^{n-}$, x and z are the same as defined in formula (I)).

The hydrotalcite of formula (I) according to the present invention which has a limited amount of crystal water does not undergo structural deformation, but only causes a change in the lattice constant (decrease in the c axis length) due to the removal of crystal water.

If said weight loss is less than 1.5%, the amount of crystal water removed may not be enough to provide an improved thermoresistance for a synthetic resin. If the weight loss is more than 5%, the hydrotalcite may undergo dehydroxylation of the hydroxide ions coordinated to a metal cation and further structural deformation, leading to the loss of its neutralizing ability.

In the hydrotalcite of formula (I), $A^{n-}$ is preferably $CO_3^{2-}$ and the value of a is preferably $0.02 \leq a \leq 0.04$. In other words, in the hydrotalcite of formula (I) according to the present invention, the amount of water molecules removed is preferably in the range of 2 to 4% by weight based on the original hydrotalcite.

According to the present invention, the hydrotalcite of formula (I) can be prepared by heat-treatment of the hydrotalcite of formula (II) at a temperature in the range of 160 to 220° C., preferably 190 to 200, for 20 to 90 minutes.

If the hydrotalcite of formula (II) is heat-treated at a temperature less than 160° C., the removal of the crystal water present between the layers may not reach an aimed level of dehydration. If the hydrotalcite of formula (II) is heat-treated at a temperature higher than 220° C., the hydrotalcite may undergo dehydroxylation and further structural deformation, leading to deteriorated chlorine-resistance. Accordingly, when the heat-treatment is not carried under the above condition, it is difficult to provide a hydrotalcite having a stable structure as well as a minimal amount of crystal water.

The condition of the heat-treatment used in the present invention may vary depending on the anion consisting a hydrotalcite.

The hydrotalcite of formula (II) used in the present invention can be prepared by a conventional method such as a co-precipitation method and a hydrothermal method.

The hydrotalcite of formula (I) according to the present invention is useful as an additive for preparing a synthetic resin. For example, the hydrotalcite of formula (I) can improve the thermoresistance of a synthetic resin such as PVC (polyvinyl chloride) and polyurethane.

The following examples are intended to illustrate the present invention, however these examples are not to be construed to limit the scope of the invention.

EXAMPLES

Example 1

Heat-Treatment of Hydrotalcite

Hydrotalcite of $(Mg_4Al_2)(OH)_{12}CO_3 \cdot 3H_2O$ (Doobon Co., Ltd., Korea) was placed in an electric furnace and heat-treated at a temperature of 120° C., 190° C., 200° C. or 240° C. for 60 minutes, so as to obtain 4 different partially dehydrated hydrotalcites.

X-ray diffraction (XRD) patterns of the hydrotalcites which were heat-treated at temperatures of 120° C., 190° C. and 240° C., respectively, are shown in FIG. 1.

Lattice constants (Å, length of a axis and c axis) of the hydrotalcites heat-treated at temperatures of 120° C., 200° C. and 240° C., respectively, are shown in Table 1.

Figure 2:
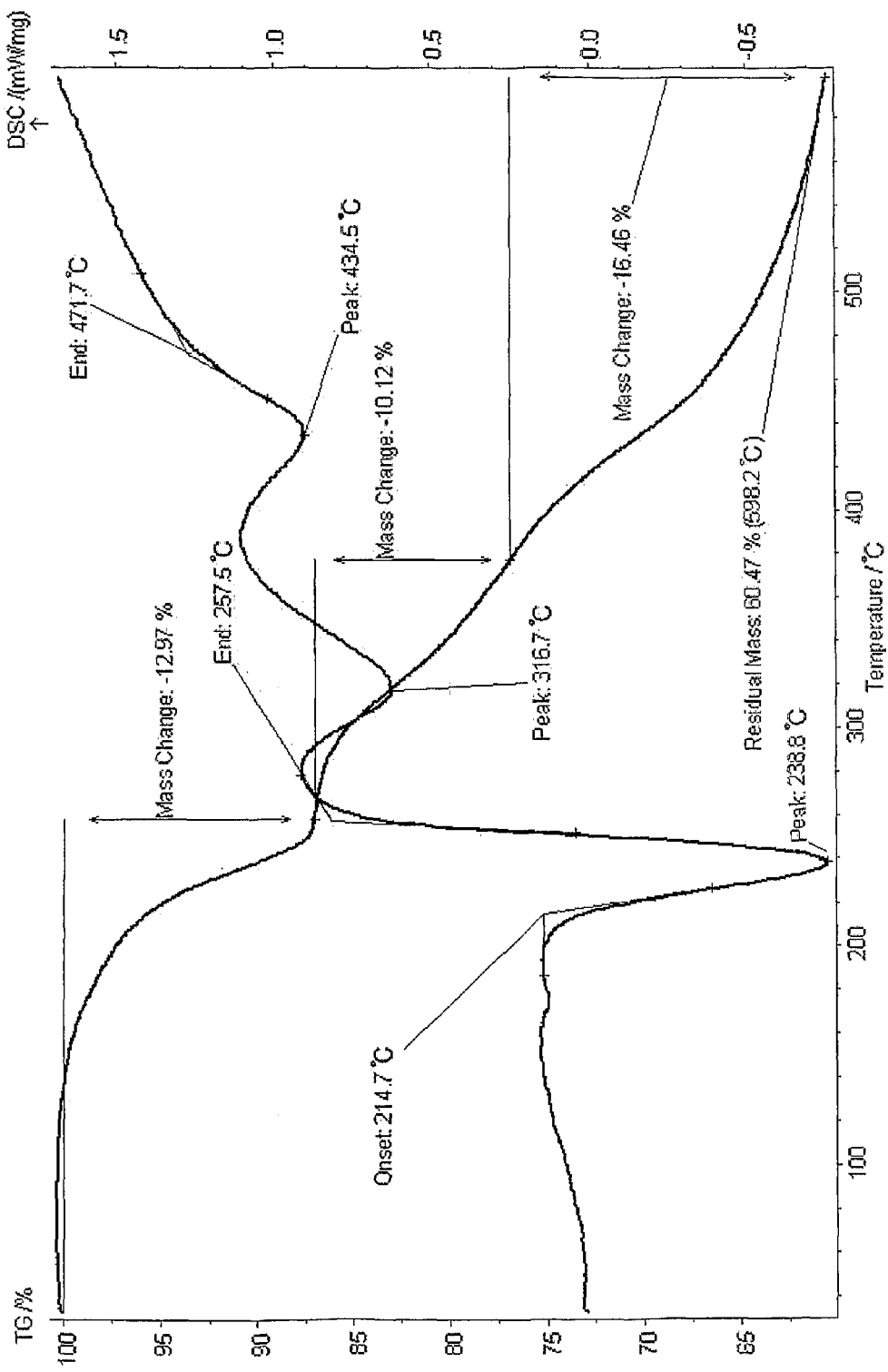
FIG. 2: a thermogravimetry-differential thermal analysis (TG-DTA) scan of $(Mg_4Al_2)(OH)_{12}CO_3 \cdot 3H_2O$.

A thermogravimetry-differential thermal analysis (TG-DTA) scan of $(Mg_4Al_2)(OH)_{12}CO_3 \cdot 3H_2O$ obtained at the temperature range of 0 to 600° C. is shown in FIG. 2.

TABLE 1

| Temperature | Lattice constant (Å) | |
|---|---|---|
| | a axis length | c axis length |
| 120° C. | 3.0555 | 23.2104 |
| 200° C. | 3.0542 | 22.5393 |
| 240° C. | 3.0600 | 20.0999 |

It can be seen from Table 1 and FIGS. 1 and 2 that the heat-treatments at 120° C., 190° C. and 200° C. did not cause any structural change of the hydrotalcite but induced a decrease in the c axis length due to the partial removal of crystal water. Accordingly, such heat-treatment only removes some of the crystal water molecules, without affecting the hydroxide ions in the layer.

However, the heat-treatment at 240° C. induced dehydroxylation and structure deformation of the hydrotalcite, leading to a partially oxidized hydrotalcite Example 2

Heat-treatment of Hydrotalcite and Measurement of Thermoresistance of PVC Containing Heat-treated Hydrotalcite Hydrotalcite of $(Mg_4Al_2)(OH)_{12}CO_3 \cdot 3H_2O$ (Doobon Co., Ltd., Korea) was placed in an electric furnace and heat-treated under the following conditions, so as to obtain various partially dehydrated hydrotalcites:

i) heat-treatment at 120° C. for 120 min,
ii) heat-treatments at 190° C. for 10 to 100 min at 10-min intervals,
iii) heat-treatments at 200° C. for 10 to 50 min at 10-min intervals, and
iv) heat-treatment at 240° C. for 100 min.

To evaluate the effect of each hydrotalcite on the thermoresistance of a resin, 100 pbw (parts by weight) of PVC resin (F. PolyLizer-120) was mixed with 30.0 pbw of DOP (dioctyl phthalate), 0.2 pbw of a Zn-based stabilizer, 0.05 pbw of DBM (dibromo methane), 20.0 pbw of $CaCO_3$ and 2.0 pbw of each of the hydrotalcites obtained above, and the mixture was kneaded at 185° C. with a roll for 5 minutes to obtain a sheet having a thickness of 0.5 mm.

Figure 3A:
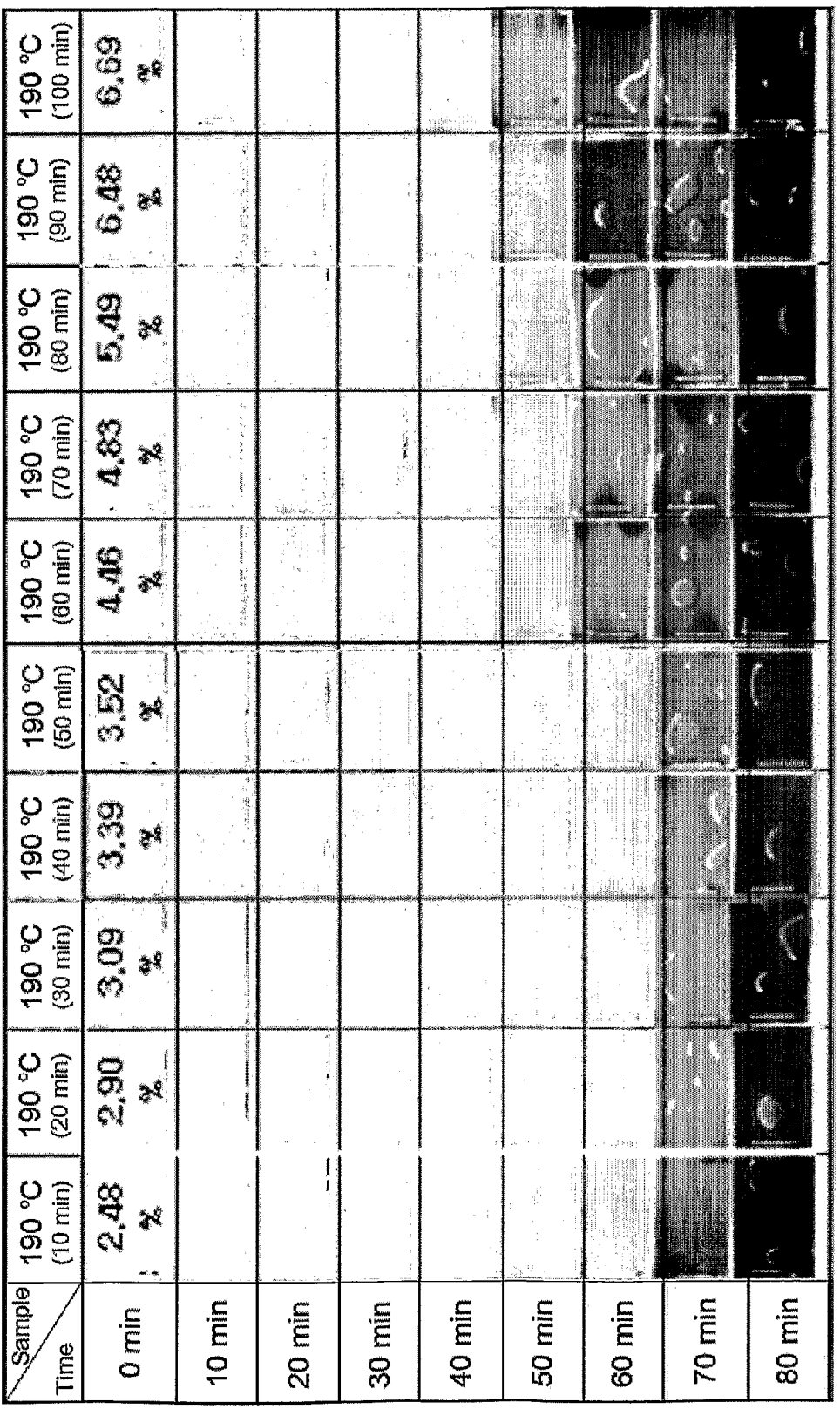
Figure 3B:
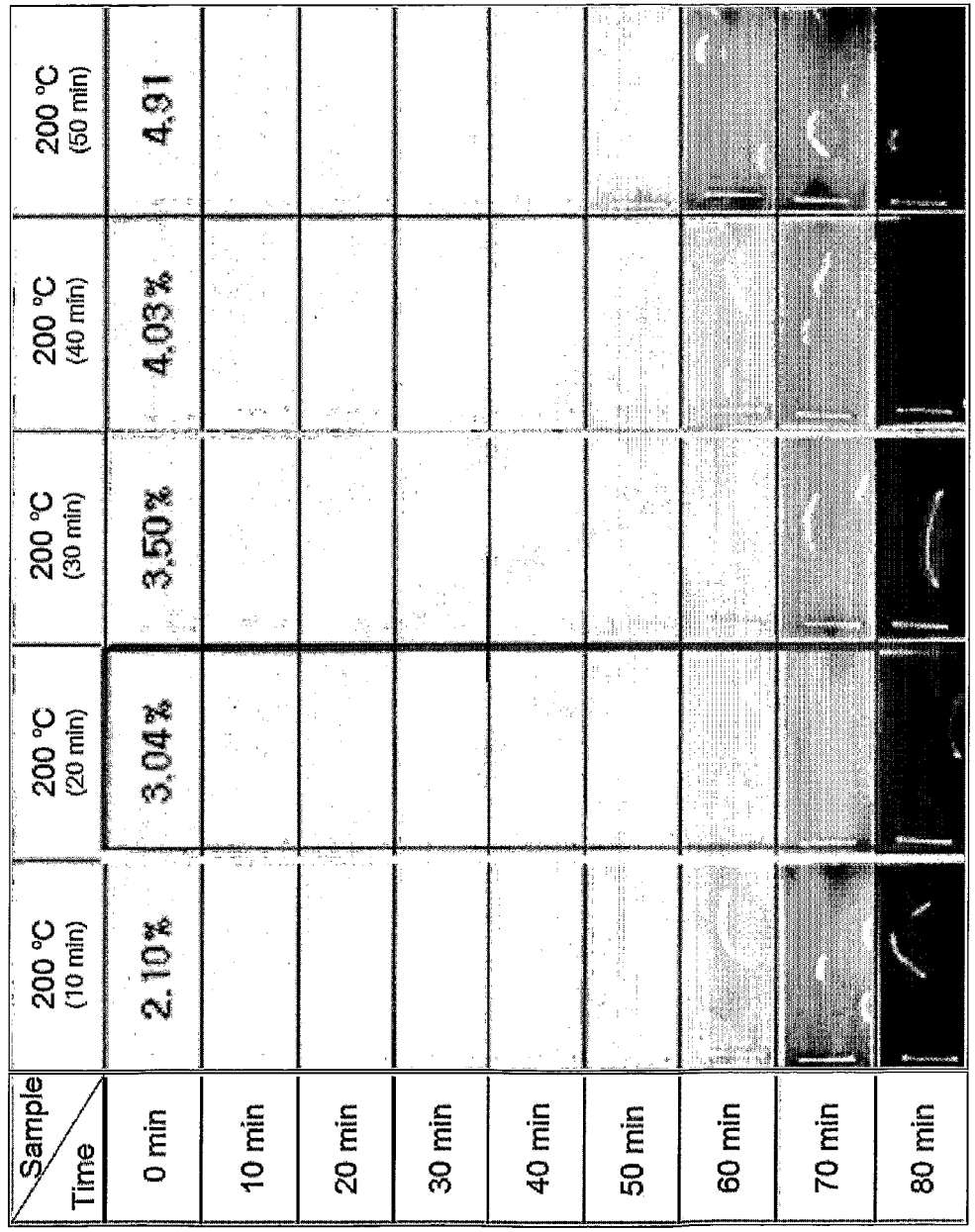

The resulting sheet was placed in a 200° C. oven, and its color change was measured at 10-min intervals for 80 minutes. The results are shown in FIGS. 3A to 3C (FIG. 3A: PVC samples containing hydrotalcites which were heat-treated at 190° C. for 10 to 100 minutes at 10-min intervals; FIG. 3B: PVC samples containing hydrotalcites which were heat-treated at 200° C. for 10 to 50 minutes at 10-min intervals; FIG. 3C: PVC samples containing hydrotalcites which were heat-treated at 120, 190 and 240° C. and a PVC sample which contained no HT).

It can be seen from FIGS. 3A to 3C that the samples comprising the hydrotalcites of the present invention which were heat-treated at 190 to 200° C. for 20 to 90 minutes impart better thermoresistance to the resin than other samples.

While the invention has been described with respect to the above specific embodiments, it should be recognized that various modifications and changes may be made to the invention by those skilled in the art which also fall within the scope of the invention as defined by the appended claims.

What is claimed is:

1. A method for producing a hydrotalcite of the Formula:

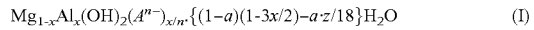

$$Mg_{1-x}Al_x(OH)_2(A^{n-})_{x/n} \cdot \{(1-a)(1-3x/2)-a \cdot z/18\}H_2O \quad (I)$$

said method comprising heating a hydrotalcite of Formula (II):

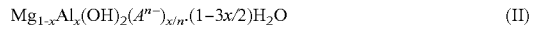

$$Mg_{1-x}Al_x(OH)_2(A^{n-})_{x/n} \cdot (1-3x/2)H_2O \quad (II)$$

at a temperature range from 160° C. to 220° C. to reduce the weight of hydrotalcite of Formula (II) by 2 to 3.52% to produce the hydrotalcite of Formula (I), wherein $A^{n-}$ is an anion selected from the group consisting of $CO_3^{2-}$, $NO^{3-}$, $SO_4^{2-}$, $OH^-$, $F^-$, $Cl^-$, $Br^-$ and an oxoanion comprising Si, P or B;

z is the formula weight of $Mg_{1-x}Al_x(OH)_2(A^{n-})_{x/n}$;

x is in the range of $0.20 < x \leq 0.33$; and a is in the range of $0.02 \leq a\ 0.0352$.

2. The method of claim 1, wherein the hydrotalcite of Formula (II) is heated at a temperature range of 190° C. to 200° C. for 20 to 90 minutes.

* * * * *

UNITED STATES PATENT AND TRADEMARK OFFICE
CERTIFICATE OF CORRECTION

PATENT NO. : 8,318,129 B2  
APPLICATION NO. : 12/918506  
DATED : November 27, 2012  
INVENTOR(S) : Sung Wook Lee et al.

Page 1 of 1

It is certified that error appears in the above-identified patent and that said Letters Patent is hereby corrected as shown below:

In the Claim:

Col. 4, Claim 1:
    Line 60, replace "a 0.0352" with --a $\leq$ 0.0352--.

Signed and Sealed this
Eighteenth Day of June, 2013

Teresa Stanek Rea
*Acting Director of the United States Patent and Trademark Office*